US012700787B2

(12) United States Patent
Kawashima et al.

(10) Patent No.: US 12,700,787 B2
(45) Date of Patent: Aug. 4, 2026

(54) ROTOR AND MAGNETIC WAVE GEAR DEVICE

(71) Applicant: Mitsubishi Electric Corporation, Tokyo (JP)

(72) Inventors: Ryosuke Kawashima, Tokyo (JP); Ryoji Miyatake, Tokyo (JP); Atsushi Yamamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 435 days.

(21) Appl. No.: 18/684,762

(22) PCT Filed: Jan. 12, 2021

(86) PCT No.: PCT/JP2021/044018
§ 371 (c)(1),
(2) Date: Feb. 19, 2024

(87) PCT Pub. No.: WO2023/100274
PCT Pub. Date: Jun. 8, 2023

(65) Prior Publication Data
US 2025/0007380 A1      Jan. 2, 2025

(51) Int. Cl.
*H02K 49/10*          (2006.01)
(52) U.S. Cl.
CPC ................................. *H02K 49/102* (2013.01)
(58) Field of Classification Search
CPC .. H02K 49/102; H02K 2213/12; H02K 16/02; H02K 1/278; Y02T 10/64
See application file for complete search history.

(56) References Cited

U.S. PATENT DOCUMENTS

| | | | |
|---|---|---|---|
| 5,818,138 | A | 10/1998 | Hill |
| 5,960,532 | A | 10/1999 | Hill |
| 10,224,773 | B2 | 3/2019 | Mundhas |

(Continued)

FOREIGN PATENT DOCUMENTS

| | | |
|---|---|---|
| EP | 3402044 A1 | 11/2018 |
| JP | H08505037 A | 5/1996 |

(Continued)

OTHER PUBLICATIONS

Notice of Reasons for Refusal dated Jul. 23, 2024, issued in the corresponding Japanese Patent Application No. 2023-564326, 9 pages including 4 pages of English Translation.

(Continued)

*Primary Examiner* — Tulsidas C Patel
*Assistant Examiner* — Mohammed Ahmed Qureshi
(74) *Attorney, Agent, or Firm* — BUCHANAN, INGERSOLL & ROONEY PC

(57) ABSTRACT

Provided is a rotor in which the magnetic resistance between magnetic poles is low. The rotor includes magnet modules arranged in an annular shape with a rotary shaft as a center. Each magnet module includes a base formed of a magnetic material, and two rotor magnets having poles different from each other and provided with a gap therebetween in the rotation direction of the rotary shaft on an outer circumferential surface of the base. The abutting rotor magnets of two magnet modules adjacent in the rotation direction have the same pole and are in close contact with each other.

7 Claims, 3 Drawing Sheets

(56)                    References Cited

U.S. PATENT DOCUMENTS

| | | | |
|---|---|---|---|
| 10,985,637 B2 * | 4/2021 | Honda ................. | H02K 15/022 |
| 2005/0194845 A1 * | 9/2005 | Engquist ................ | H02K 15/10 |
| | | | 310/44 |
| 2012/0217834 A1 | 8/2012 | Lutz et al. | |
| 2014/0042868 A1 | 2/2014 | Sullivan et al. | |
| 2016/0006304 A1 * | 1/2016 | Tojima ................. | H02K 1/2706 |
| | | | 310/154.02 |
| 2019/0036400 A1 | 1/2019 | Shibahara et al. | |
| 2020/0336031 A1 | 10/2020 | Takahashi | |
| 2021/0067019 A1 * | 3/2021 | Sun ...................... | H02K 1/2791 |

FOREIGN PATENT DOCUMENTS

| | | | |
|---|---|---|---|
| JP | 2013106499 A | 5/2013 | |
| JP | 2014511669 A | 5/2014 | |
| JP | 2016135014 A | 7/2016 | |
| JP | 2019030063 A | 2/2019 | |
| JP | 2019122223 A | 7/2019 | |
| JP | 2020018130 A | 1/2020 | |
| WO | 2013111335 A1 | 8/2013 | |
| WO | 2019131905 A1 | 7/2019 | |
| WO | 2020022017 A1 | 1/2020 | |
| WO | 2020162232 A1 | 8/2020 | |

OTHER PUBLICATIONS

Extended European Search Report dated Dec. 18, 2024, issued in the corresponding European Patent Application No. 21966358.0, 10 pages.
International Search Report (PCT/ISA/210) with translation and Written Opinion (PCT/ISA/237) mailed on Jan. 18, 2022, by the Japan Patent Office as the International Searching Authority for International Application No. PCT/JP2021/044018. (9 pages).

\* cited by examiner

ROTOR AND MAGNETIC WAVE GEAR DEVICE

TECHNICAL FIELD

The present disclosure relates to a rotor and a magnetic wave gear device.

BACKGROUND ART

As an electric generator of a wind power generation device, a magnetic wave gear device obtained by integrating a magnetic speed reducer and a rotating machine has been known. The magnetic wave gear device includes a low-speed rotor, a high-speed rotor provided coaxially with the low-speed rotor, and a stator including a stator winding and a permanent magnet. The magnetic wave gear device can change the rotation speed of the rotor in a non-contact manner, without using a mechanical transmission in which mechanical wear occurs. Thus, in the magnetic wave gear device, the load of maintenance for mechanical wear is reduced. In addition, when the magnetic wave gear device is used as an electric generator of a wind power generation device, speed change and power generation are possible with one device, and thus the size of an electric generation system is reduced and space saving can be achieved.

As a conventional magnetic wave gear device, a magnetic wave gear device in which a stator having a plurality of permanent magnets, a high-speed rotor having a plurality of rotor magnets, and a low-speed rotor having a plurality of magnetic pole pieces are concentrically arranged, is disclosed (e.g., see Patent Document 1). As the high-speed rotor of the magnetic wave gear device, a rotor in which a plurality of magnet modules obtained by fixing rotor magnets to bases are arranged in the circumferential direction, can be used. As the rotor, a rotor in which the base of the magnet module is formed of a magnetic material is disclosed (e.g., see Patent Document 2).

CITATION LIST

Patent Document

Patent Document 1: Japanese Laid-Open Patent Publication No. 2016-135014
Patent Document 2: Japanese Laid-Open Patent Publication No. 2019-30063

SUMMARY OF THE INVENTION

Problem to be Solved by the Invention

However, in a conventional rotor, a boundary between the magnet modules is a boundary between adjacent magnetic poles, and thus the magnetic resistance between the magnetic poles is high. Therefore, even if the conventional rotor is applied to the magnetic wave gear device, the magnetic resistance between the magnetic poles of the rotor is high, thus causing a problem that the output is low.

The present disclosure has been made to solve the above problem, and an object of the present disclosure is to provide a rotor having low magnetic resistance between the magnetic poles.

Means to Solve the Problem

A rotor of the present disclosure includes magnet modules arranged in an annular shape with a rotary shaft as a center.

Each magnet module includes a base formed of a magnetic material, and two rotor magnets having poles different from each other and provided with a gap therebetween in the rotation direction of the rotary shaft on an outer circumferential surface of the base. The rotor magnets abutting each other of two said magnet modules adjacent in the rotation direction have the same pole and are in close contact with each other.

Effect of the Invention

In the rotor of the present disclosure, the abutting rotor magnets of the two magnet modules adjacent in the rotation direction have the same pole and are in close contact with each other, so that the magnetic resistance between the magnetic poles can be reduced.

DESCRIPTION OF EMBODIMENTS

Figure 1:
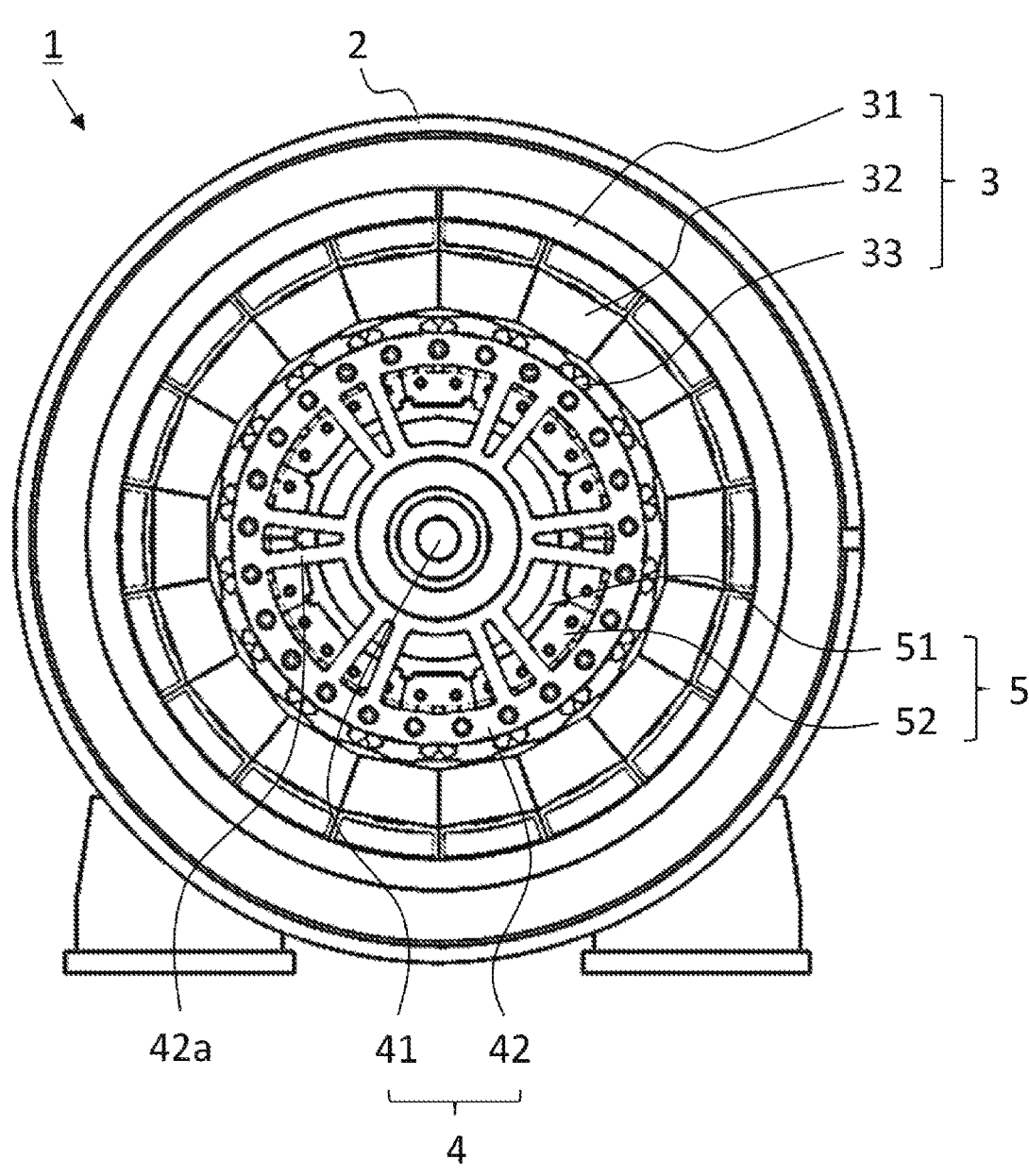
FIG. 1 is a front view of a magnetic wave gear device according to embodiment 1.

Hereinafter, a rotor and a magnetic wave gear device according to an embodiment for carrying out the present disclosure will be described in detail with reference to the drawings. In the drawings, the same reference characters denote the same or corresponding parts.

Embodiment 1

FIG. 1 is a front view of a magnetic wave gear device according to embodiment 1. A magnetic wave gear device 1 of the present embodiment has a cylindrical frame 2, a stator 3, a low-speed rotor 4, and a high-speed rotor 5. The stator 3 includes a stator core 31 which has a plurality of slots disposed in the circumferential direction, stator windings 32 provided in the slots, and stator magnets 33. The stator 3 is fixed to the frame 2, on an inner circumferential side of the frame 2. The low-speed rotor 4 has a cylindrical low-speed rotor core provided with a gap on an inner circumferential side of the stator 3. The high-speed rotor 5 is concentric with a rotary shaft 41 of the low-speed rotor 4, and is provided with a gap on an inner circumferential side of the low-speed rotor core. The high-speed rotor 5 includes a cylindrical high-speed rotor core 51, and magnet modules 52 disposed so as to be arranged in the circumferential direction. The low-speed rotor 4 includes a low-speed rotor end plate 42 which fastens the low-speed rotor core and the rotary shaft 41 on an outer side of the high-speed rotor 5 in a direction of the rotary shaft 41. As shown in FIG. 1, the low-speed rotor end plate 42 of the present embodiment includes a plurality of spokes 42a. Openings are formed between the plurality of spokes 42a.

Figure 2:
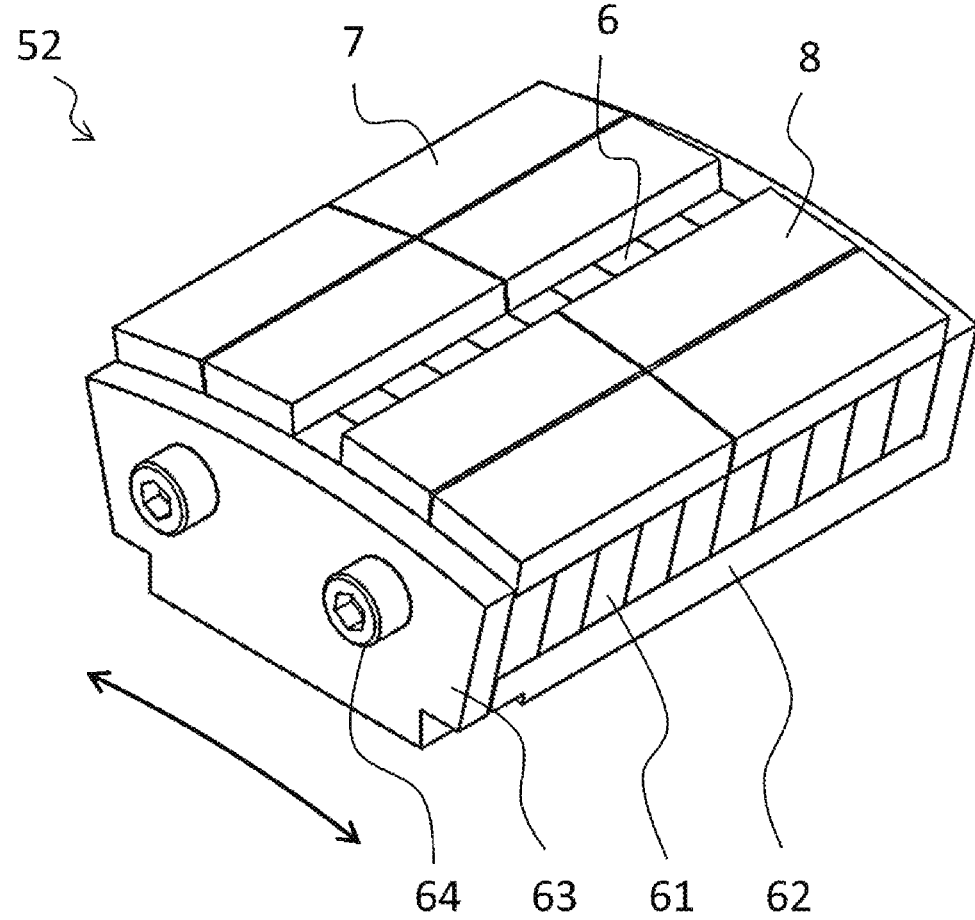
FIG. 2 is a perspective view of a magnet module according to embodiment 1.

FIG. 2 is a perspective view of the magnet module according to the present embodiment. In FIG. 2, a direction indicated by a double-sided arrow is the rotation direction of the rotary shaft 41 of the magnetic wave gear device 1 shown in FIG. 1. Each magnet module 52 includes a base 6, and two rotor magnets 7, 8 having poles different from each other and provided with a gap therebetween in the rotation direction on an outer circumferential surface of the base 6. The base 6 is formed of a plurality of electromagnetic steel sheets 61 stacked in the axial direction of the rotary shaft. The plurality of electromagnetic steel sheets 61 are fixed by a bottom plate 62 having an L-shaped cross-section, an end plate 63, and fixing bolts 64.

The two rotor magnets 7, 8 have poles different from each other. For example, when an outer circumferential side of the rotor magnet 7 is an N pole, an outer circumferential side of the rotor magnet 8 is an S pole. As shown in FIG. 2, the two rotor magnets 7, 8 are each bisected in the rotation direction and in the axial direction, to form four magnet pieces. The magnet pieces are firmly fixed to the base 6 by, for example, an adhesive.

Figure 3:
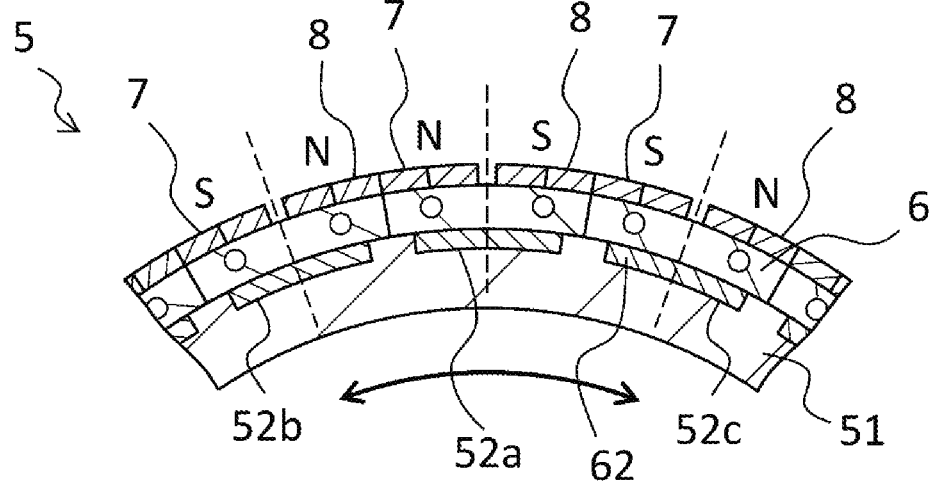
FIG. 3 is a cross-sectional view of a high-speed rotor according to embodiment 1.

FIG. 3 is a cross-sectional view of a high-speed rotor according to the present embodiment. The high-speed rotor 5 according to the present embodiment includes the magnet modules 52 arranged in close contact so as to form an annular shape on an outer circumferential surface of the cylindrical high-speed rotor core 51. FIG. 3 shows a part of a cross-section of the high-speed rotor 5 in which the magnet modules 52 are disposed in the rotation direction of the rotary shaft 41. In FIG. 3, a direction indicated by a double-sided arrow is the rotation direction of the rotary shaft 41 of the magnetic wave gear device 1 shown in FIG. 1. As shown in FIG. 3, the abutting rotor magnets of the magnet modules 52 adjacent in the rotation direction have the same pole and are in close contact with each other. Thus, one magnetic pole is located across two magnet modules 52. In FIG. 3, broken lines indicate boundaries between magnetic poles. For example, the N-pole rotor magnet 7 on the left side of the magnet module 52*a* disposed at the center and the N-pole rotor magnet 8 on the right side of the magnet module 52*b* disposed on the left side form one N-pole magnetic pole. Similarly, the S-pole rotor magnet 8 on the right side of the magnet module 52*a* disposed at the center and the S-pole rotor magnet 7 on the left side of the magnet module 52*c* disposed on the right side form one S-pole magnetic pole.

In the high-speed rotor 5 configured as described above, each boundary between the magnetic poles is located at a center part of the magnet module. Thus, the base of the magnet module serves as a magnetic path between the magnetic poles, thereby decreasing the magnetic resistance between the magnetic poles. As a result, reduction in output of the magnetic wave gear device using the high-speed rotor can be inhibited.

In addition, since the base of the magnet module is formed of the electromagnetic steel sheets stacked in the axial direction, a current route in the axial direction is split, so that it becomes difficult for eddy current to flow. Thus, in the magnet module, eddy current loss due to harmonic magnetic flux can be reduced.

Figure 4:
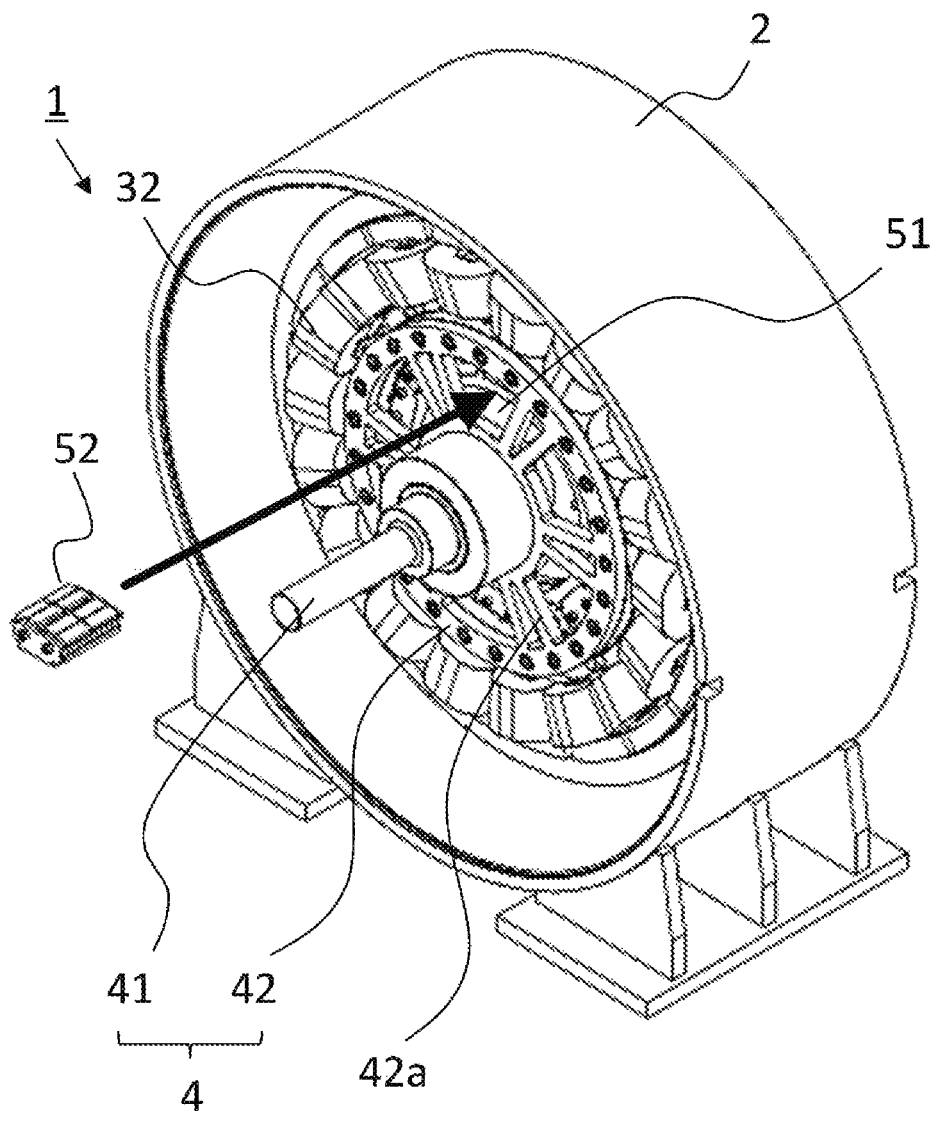
FIG. 4 is a perspective view of the magnetic wave gear device according to embodiment 1.

FIG. 4 is a perspective view of the magnetic wave gear device according to the present embodiment. As shown in FIG. 4, the low-speed rotor end plate 42 includes the plurality of spokes 42*a*. Openings are formed between the spokes 42*a*. As indicated by an arrow in FIG. 4, the magnet module 52 can also be disposed through the opening onto the outer circumferential surface of the high-speed rotor core 51. In the case where the high-speed rotor is assembled as described above, when the high-speed rotor core 51 is inserted to the inner circumferential side of the stator 3, the rotor magnets 7, 8 have not been assembled in the high-speed rotor core 51. Thus, when the high-speed rotor core 51 is inserted, no magnetic attraction force occurs between the stator magnets 33 and the rotor magnets 7, 8. As a result, when the high-speed rotor core 51 is inserted in the stator 3, no force acts in a direction perpendicular to the insertion direction, so that the high-speed rotor core 51 can be inserted accurately in the stator 3.

In addition, since no force acts in the direction perpendicular to the insertion direction when the high-speed rotor 5 is inserted in the stator 3, it is also unnecessary to increase a gap between the high-speed rotor 5 and the stator 3 in order to improve the efficiency of assembling work. If the gap between the high-speed rotor 5 and the stator 3 is increased, the output of the magnetic wave gear device decreases. Therefore, in the magnetic wave gear device according to the present embodiment, the output reduction due to the increased gap between the high-speed rotor and the stator can also be inhibited.

In the present embodiment, the base of the magnet module is formed of the stacked electromagnetic steel sheets. In the case where eddy current loss due to a harmonic magnetic flux does not cause any problem, the base of the magnet module may be an integrated magnetic material.

In addition, in the present embodiment, the two rotor magnets 7, 8 are each bisected in the rotation direction and in the axial direction, to form the four magnet pieces. When the rotor magnets 7, 8 are divided into the magnet pieces, it becomes difficult for eddy current due to a harmonic magnetic flux to flow and eddy current loss in the rotor magnets 7, 8 can be reduced. However, in the case where eddy current loss in the rotor magnets does not cause any problem, each of the rotor magnets 7, 8 may be composed of one magnet.

Embodiment 2

In embodiment 1, as the base of the magnet module, the base in which the plurality of electromagnetic steel sheets are stacked is used. In embodiment 2, as the base of the magnet module, a powdered magnetic material is used. In embodiment 2, the configuration of the magnet module other than the above is the same as that of the magnet module in embodiment 1. In addition, the configurations of the high-speed rotor and the magnetic wave gear device are also the same as those in embodiment 1.

As the powdered magnetic material, a powder material such as iron, or an alloy of iron and nickel can be used, for example.

In the high-speed rotor using the magnet module configured as described above, each boundary between the magnetic poles is located at the center part of the magnet module. Thus, the base of the magnet module serves as the magnetic path between the magnetic poles, so that the magnetic resistance between the magnetic poles decreases and reduction in output of the magnetic wave gear device using the high-speed rotor can be inhibited.

In addition, since the base of the magnet module is formed of the powdered magnetic material, the current route is split and it becomes difficult for eddy current to flow, as in embodiment 1. Thus, in the magnet module, eddy current loss due to a harmonic magnetic flux can be reduced.

Although the disclosure is described above in terms of various exemplary embodiments, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE
CHARACTERS 1 magnetic wave gear device
2 frame
3 stator
4 low-speed rotor
5 high-speed rotor
6 base
7, 8 rotor magnet
31 stator core
32 stator winding
33 stator magnet
41 rotary shaft
42 low-speed rotor end plate
42a spoke
51 high-speed rotor core
52, 52a, 52b, 52c magnet module
61 electromagnetic steel sheet
62 bottom plate
63 end plate
64 fixing bolt
The invention claimed is:
1. A rotor comprising magnet modules arranged in an annular shape with a rotary shaft as a center, wherein
    each magnet module includes a base formed of a magnetic material, and two rotor magnets having poles different from each other and provided with a gap therebetween in the rotation direction of the rotary shaft on an outer circumferential surface of the base, and
    the rotor magnets abutting each other of two said magnet modules adjacent in the rotation direction have the same pole and are in close contact with each other.

2. The rotor according to claim 1, wherein the base is formed of electromagnetic steel sheets stacked in the axial direction of the rotary shaft.

3. The rotor according to claim 1, wherein the base is formed of a powdered magnetic material.

4. A magnetic wave gear device comprising:
    a stator which includes a stator core having a plurality of slots disposed in the circumferential direction, stator windings provided in the slots, and stator magnets;
    a first rotor provided with a gap on an inner circumferential side of the stator; and
    a second rotor which is concentric with a rotary shaft of the first rotor and is provided with a gap on an inner circumferential side of the first rotor, wherein
    the second rotor is formed of the rotor according to claim 1.

5. A magnetic wave gear device comprising:
    a stator which includes a stator core having a plurality of slots disposed in the circumferential direction, stator windings provided in the slots, and stator magnets;
    a first rotor provided with a gap on an inner circumferential side of the stator; and
    a second rotor which is concentric with a rotary shaft of the first rotor and is provided with a gap on an inner circumferential side of the first rotor, wherein
    the second rotor is formed of the rotor according to claim 2.

6. A magnetic wave gear device comprising:
    a stator which includes a stator core having a plurality of slots disposed in the circumferential direction, stator windings provided in the slots, and stator magnets;
    a first rotor provided with a gap on an inner circumferential side of the stator; and
    a second rotor which is concentric with a rotary shaft of the first rotor and is provided with a gap on an inner circumferential side of the first rotor, wherein
    the second rotor is formed of the rotor according to claim 3.

7. The rotor according to claim 1, wherein each magnet module is arranged such that its rotor magnets are, in a radial direction of the rotor shaft, radially outward of its base.

* * * * *